United States Patent
Tanno et al.

(10) Patent No.: US 8,195,181 B2
(45) Date of Patent: Jun. 5, 2012

(54) CHANNEL ASSIGNMENT METHOD, RADIO COMMUNICATION SYSTEM AND CHANNEL STRUCTURE IN RADIO SECTION

(75) Inventors: Motohiro Tanno, Yokohama (JP); Kenichi Higuchi, Yokohama (JP); Mamoru Sawahashi, Yokohama (JP)

(73) Assignee: NTT DoCoMo, Inc., Tokyo (JP)

(*) Notice: Subject to any disclaimer, the term of this patent is extended or adjusted under 35 U.S.C. 154(b) by 0 days.

(21) Appl. No.: 13/246,461

(22) Filed: Sep. 27, 2011

(65) Prior Publication Data
US 2012/0014348 A1 Jan. 19, 2012

Related U.S. Application Data

(63) Continuation of application No. 11/917,743, filed on Jan. 12, 2009, now Pat. No. 8,112,090.

(51) Int. Cl.
*H04W 72/00* (2009.01)

(52) U.S. Cl. .......... 455/450; 455/452.1; 455/452.2; 455/453; 455/509; 370/329; 370/330; 370/348; 370/341; 370/431

(58) Field of Classification Search .......... 455/450, 455/509, 452.1, 452.2, 453; 370/329, 330, 370/341, 348, 431, 210, 260
See application file for complete search history.

(56) References Cited

U.S. PATENT DOCUMENTS

| | | | |
|---|---|---|---|
| 5,729,541 A | 3/1998 | Hamalainen et al. | |
| 6,097,700 A | 8/2000 | Thornberg et al. | |
| 6,711,403 B1 | 3/2004 | Herrmann et al. | |
| 6,731,905 B2 | 5/2004 | Ogino et al. | |
| 2003/0096631 A1* | 5/2003 | Kayama et al. | 455/522 |
| 2004/0047343 A1 | 3/2004 | Muniere | |
| 2006/0034239 A1* | 2/2006 | Abeta et al. | 370/341 |
| 2007/0242654 A1* | 10/2007 | Kawabata et al. | 370/348 |
| 2009/0103483 A1* | 4/2009 | Higuchi et al. | 370/329 |
| 2009/0129322 A1 | 5/2009 | Suwa et al. | |

FOREIGN PATENT DOCUMENTS

| | | |
|---|---|---|
| CN | 1482823 A | 3/2004 |
| JP | 2001-346250 | 12/2001 |
| JP | 2002-171573 | 6/2002 |
| JP | 2003-163962 A | 6/2003 |
| JP | 2004-128967 | 4/2004 |
| JP | 2004-297824 | 10/2004 |

(Continued)

OTHER PUBLICATIONS

Performation Analysis of the IEEE 802.16 Wireless Metropolitan Area Network (Dong-Hoon Cho, Jung-Hoon Song, Min-Su Kim, and Ki-Jun Han; Department of Computer Engineering, Kyungpook National University, Korea; 2002.).*

(Continued)

*Primary Examiner* — Danh Le
*Assistant Examiner* — Khai M Nguyen
(74) *Attorney, Agent, or Firm* — Osha • Liang LLP

(57) ABSTRACT

In a radio communication system, a user terminal transmits a reservation packet to a base station using a common control channel (1), and the base station assigns an uplink data channel to the user terminal according to the reservation packet, and assigns a first shared control channel (2b) to the user terminal in association with the uplink data channel, and the mobile station transmits a control signal to the base station using the associated uplink shared control channel. According to status of radio communication, the base station may assign beforehand a second uplink shared control channel (2a) for which occupation by the user terminal is permitted only while the user terminal is performing communication.

5 Claims, 11 Drawing Sheets

FOREIGN PATENT DOCUMENTS

| | | |
|---|---|---|
| JP | 2004-304411 | 10/2004 |
| JP | 2004-312190 | 11/2004 |
| JP | 2004-336814 | 11/2004 |
| JP | 2005-130053 | 5/2005 |
| WO | 2004/034656 A2 | 4/2004 |

OTHER PUBLICATIONS

International Search Report for PCT/JP2006/311879 mailed Sep. 19, 2006, 2 pages.

Written Opinion of the International Searching Authority mailed Sep. 19, 2006, 3 pages.

"UTRAN Iur interface user plane protocols for Common Transport Channel data streams," 3GPP TS 25.425 V3.8.0 (Dec. 2003), 26 pages.

Taiwanese Office Action for Tawainese application No. 095120957, mailed on Jan. 5, 2009, (9 pages).

Office Action of Japan with Patent Application No. 2005-174401, dated Aug. 18, 2010, with English translation thereof (5 pages).

Patent Abstracts of Japan with Publication No. 2001-346250, Publication date Dec. 14, 2001 (21 pages).

Chinese Office Action for Application No. 200680028461.3, mailed on Dec. 9, 2010 (12 pages).

esp@cenet Patent Abstract for Chinese Publication No. 1482823, publication date Mar. 17, 2004. (1 page).

* cited by examiner

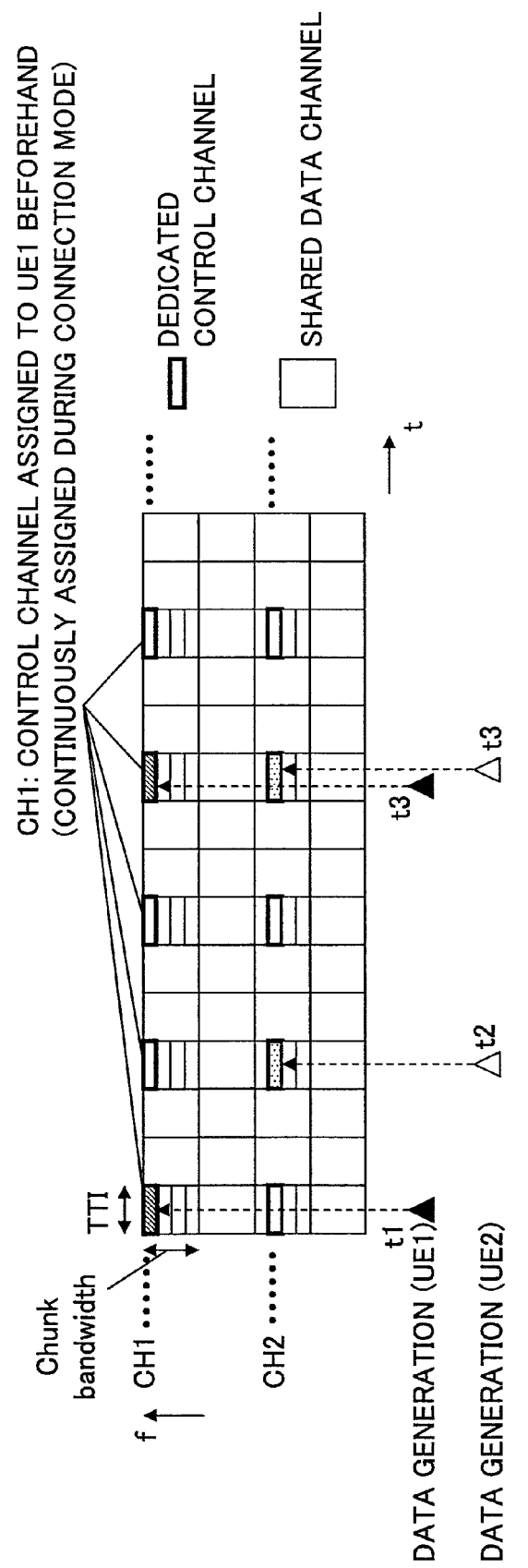

FIG.2

| UPLINK CONTROL SIGNAL | SUMMARY AND CONCRETE CONTROL INFORMATION | OCCURRENCE TIMING, PERIOD |
|---|---|---|
| (1) FOR UPLINK DATA TRANSMISSION | INFORMATION NECESSARY FOR DATA PACKET DEMODULATION<br>• MCS, BLOCK SIZE, ETC. | WHEN TRANSMITTING UPLINK DATA PACKET |
| (2) FOR UPLINK RETRANSMISSION CONTROL | TRANSMISSION SIDE CONTROL SIGNAL NECESSARY FOR UPLINK RETRANSMISSION CONTROL<br>• PACKET NUMBER ETC. | WHEN TRANSMITTING UPLINK DATA PACKET |
| (3) FOR UPLINK SCHEDULING | CONTROL SIGNAL USED FOR UPLINK SCHEDULING<br>• QUEUE-ID, DATA SIZE, UE TRANSMISSION POWER | (a) WHEN REQUESTING RESERVATION (WHEN STARTING COMMUNICATION)<br>(b) WHEN REQUESTING RESERVATION (DURING COMMUNICATION)<br>(c) PERIODICALLY OR WHEN STATE CHANGES |
| (4) FOR DOWNLINK RETRANSMISSION CONTROL | RECEIVE SIDE CONTROL SIGNAL NECESSARY FOR DOWNLINK RETRANSMISSION CONTROL<br>• ACK/NACK | WHEN RECEIVING DOWNLINK DATA PACKET |
| (5) FOR DOWNLINK SCHEDULING | CONTROL SIGNAL USED FOR DOWNLINK SCHEDULING<br>• CQI | PERIODICALLY OR WHEN STATE CHANGES |
| (6) FEEDBACK CONTROL SIGNAL FOR DOWNLINK DATA TRANSMISSION | FEEDBACK CONTROL SIGNAL USED FOR DOWNLINK DATA TRANSMISSION<br>• MIMO TRANSMISSION PHASE CONTROL ETC. | PERIODICALLY OR WHEN STATE CHANGES |

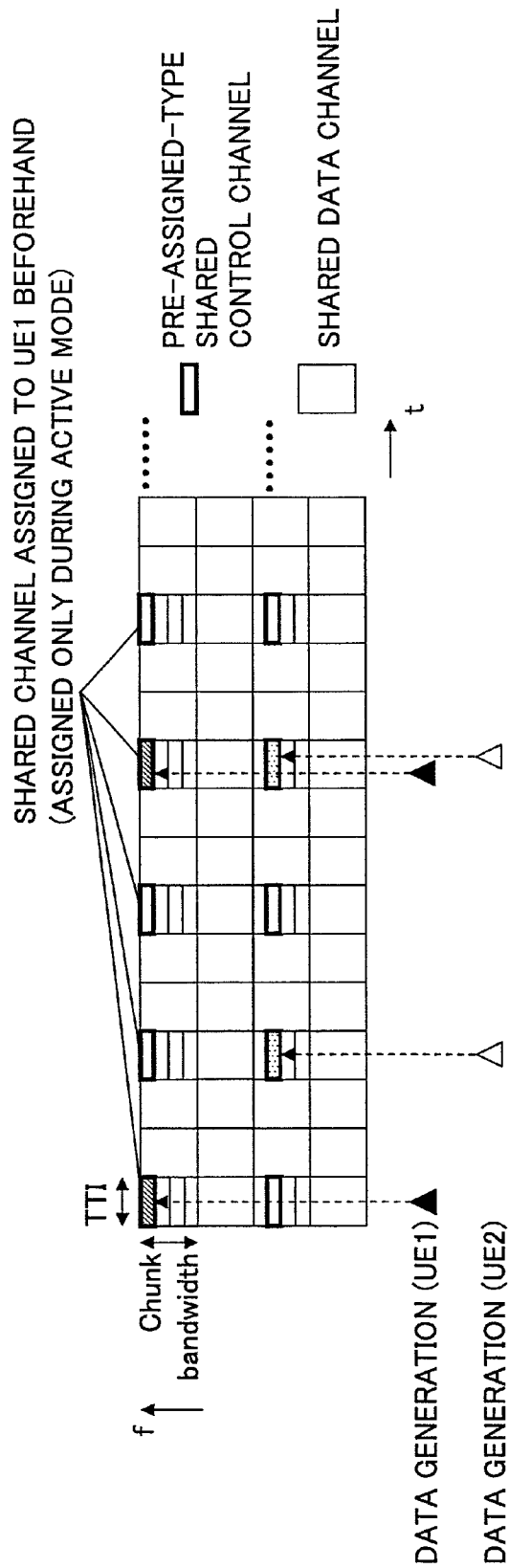

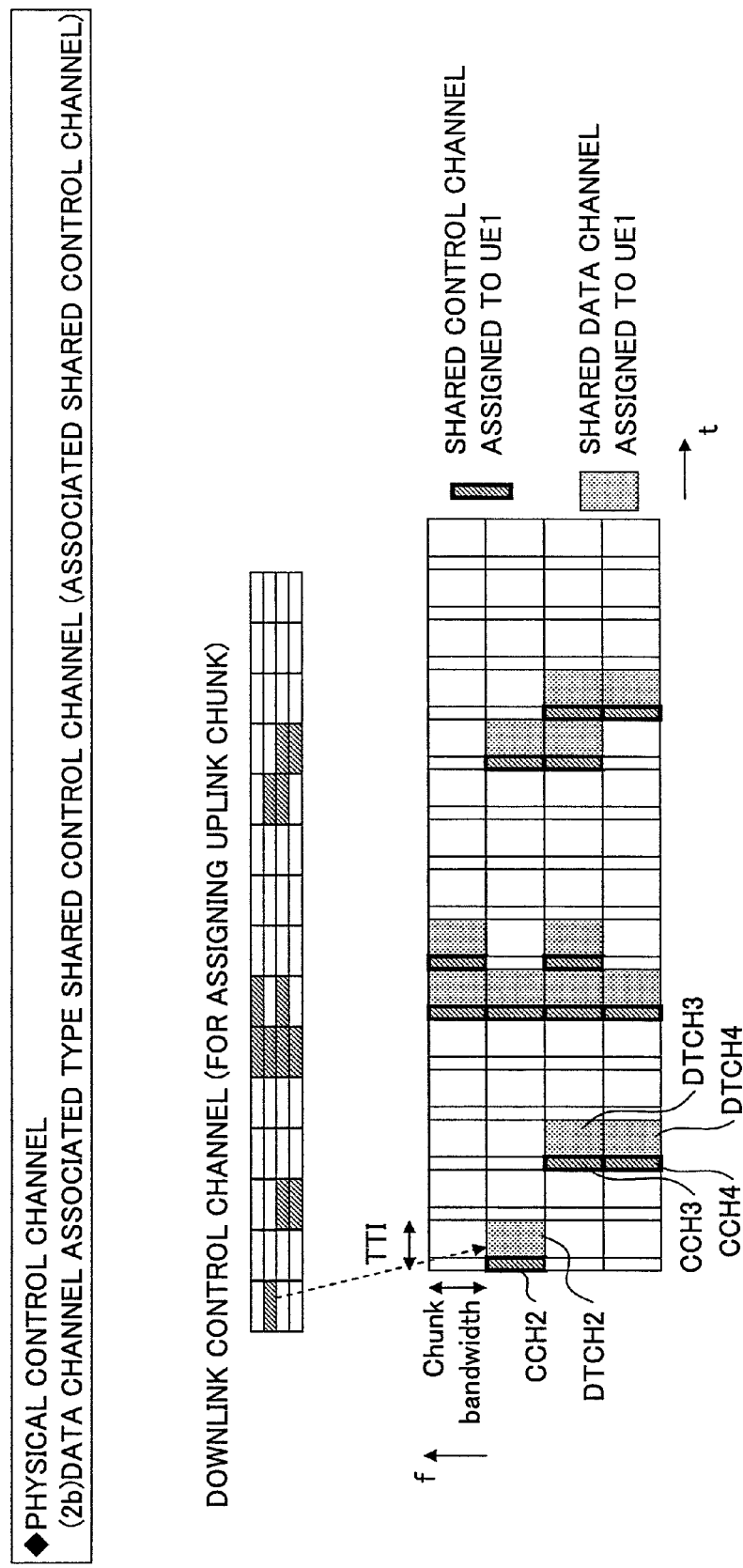

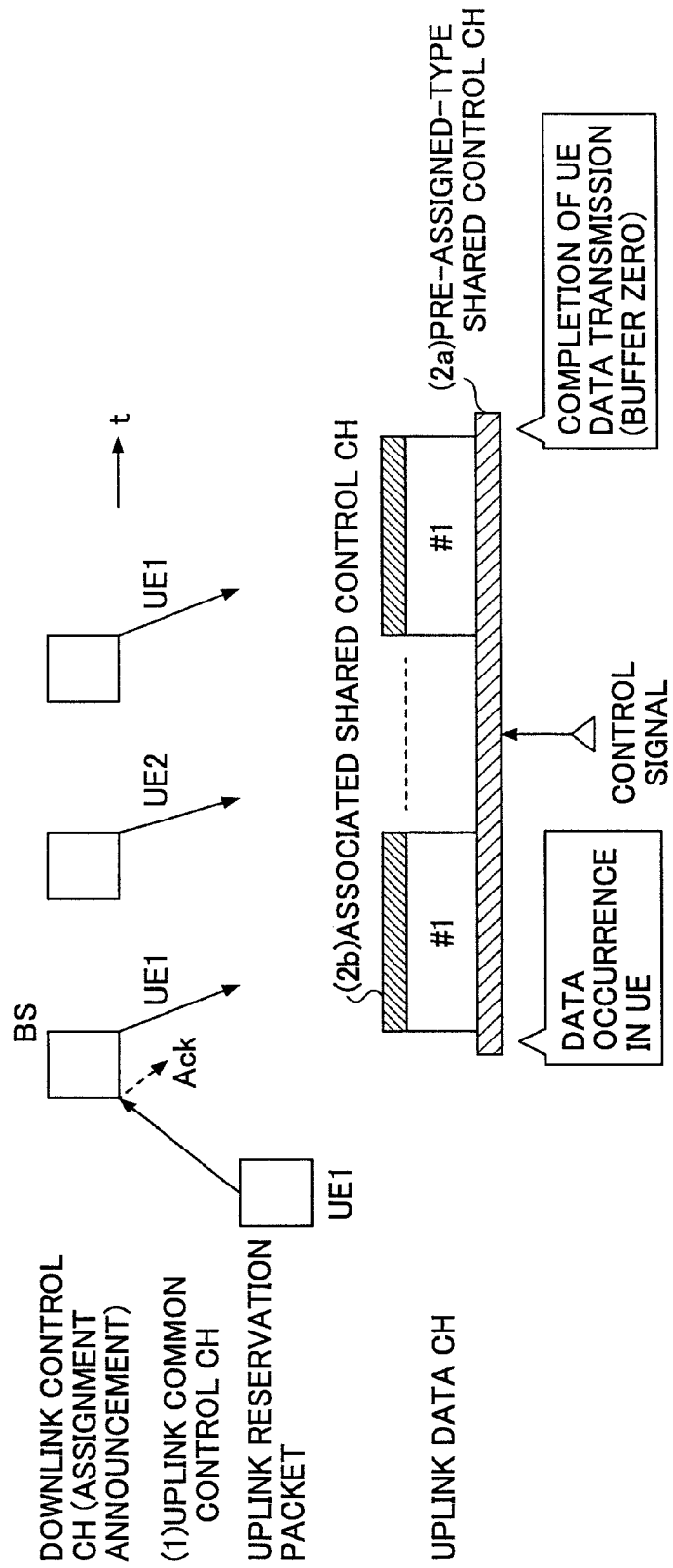

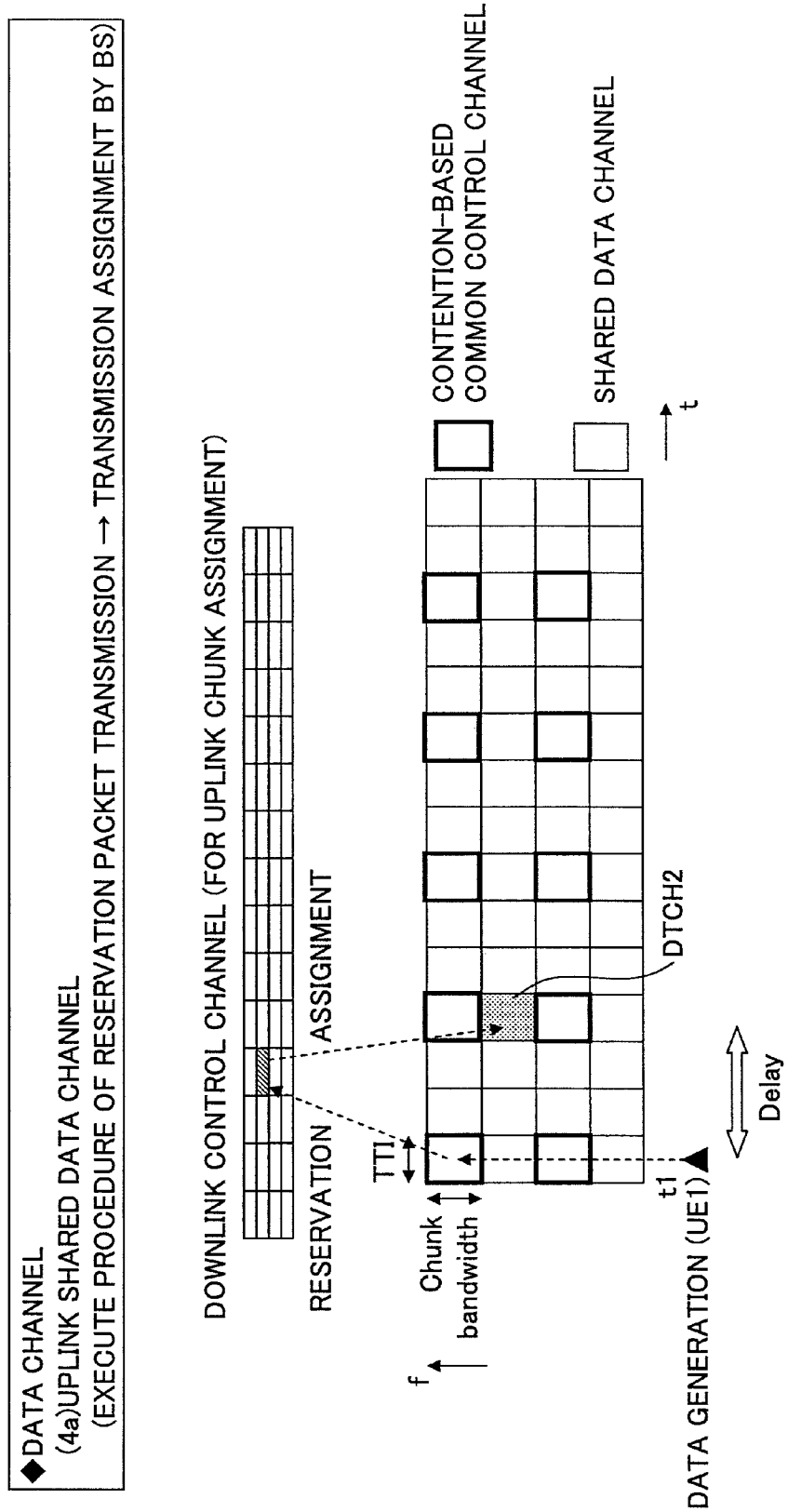

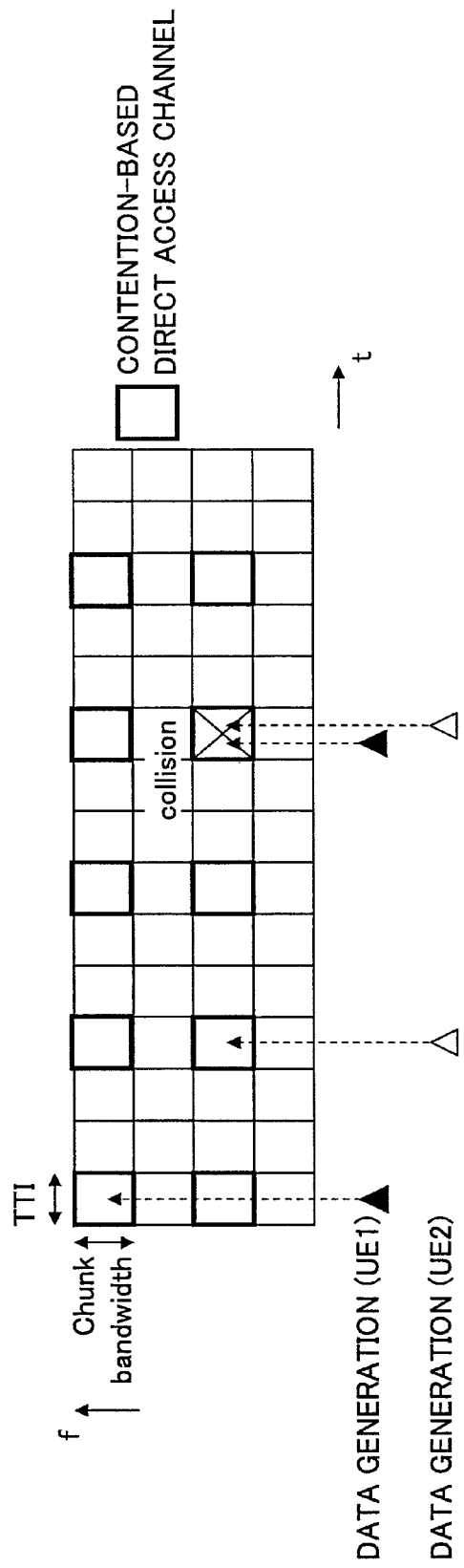

FIG.10

| UPLINK CONTROL SIGNAL | CHANNEL TO BE TRANSMITTED |
|---|---|
| (1) FOR UPLINK DATA TRANSMISSION | (2b) DATA CHANNEL ASSOCIATED TYPE SHARED CONTROL CHANNEL |
| (2) FOR UPLINK RETRANSMISSION CONTROL | (2b) DATA CHANNEL ASSOCIATED TYPE SHARED CONTROL CHANNEL |
| (3) FOR UPLINK SCHEDULING | (1) COMMON CONTROL CHANNEL<br>(2a) PRE-ASSIGNED-TYPE SHARED CONTROL CHANNEL<br>(4a) SHARED DATA CHANNEL<br>(4b) SHARED DATA CHANNEL (STEAL TYPE)<br>(4c) DIRECT ACCESS CHANNEL |
| (4) FOR DOWNLINK RETRANSMISSION CONTROL | (2b) DATA CHANNEL ASSOCIATED TYPE SHARED CONTROL CHANNEL |
| (5) FOR DOWNLINK SCHEDULING | (2a) PRE-ASSIGNED-TYPE SHARED CONTROL CHANNEL |
| (6) FEEDBACK CONTROL SIGNAL FOR DOWNLINK DATA TRANSMISSION | (2a) PRE-ASSIGNED-TYPE SHARED CONTROL CHANNEL |

CHANNEL ASSIGNMENT METHOD, RADIO COMMUNICATION SYSTEM AND CHANNEL STRUCTURE IN RADIO SECTION

CROSS-REFERENCE TO RELATED APPLICATIONS

The present application is a Continuation of and claims benefit, pursuant to 35 U.S.C. §120, to U.S. patent application Ser. No. 11/917,743, filed Jan. 12, 2009 now U.S. Pat. No. 8,112,090. That application is hereby incorporated by reference in its entirety.

TECHNICAL FIELD

The present invention generally relates to a radio resource assignment method, and more particularly, relates to channel assignment in transmission of a control signal in an uplink and relates to channel configuration in a radio section.

BACKGROUND ART

In UMTS (Universal Mobile Telecommunication System) that is one of the third generation mobile communication schemes (3G), HSDPA (High Speed Downlink Packet Access) is standardized as a method for realizing high speed packet transmission in a downlink from a base station to a mobile station.

In HSDPA, for increasing the throughput that can be realized, a packet scheduling technique is adopted in which users connected to the base station share radio resources and the base station preferentially assigns the radio resources to a user in a good propagation state.

In 3GPP (3rd Generation Partnership Project), a technique for choosing channels according to characteristics of a signal sent and received between the radio base station and the mobile station is adopted (refer to non-patent document 1, for example). For example, as to common control physical channel such as SCCPCH (Secondary Common Control Physical Channel), one channel is assigned to a plurality of mobile stations in a time division manner, and it is effective as a channel that can use radio resources efficiently among mobile stations.

On the other hand, in an uplink, a dedicated control channel assigned for each user while the mobile terminal is connected is used. FIG. 1 is a diagram showing an assignment example of the dedicated control channel. In FIG. 1, the lateral axis indicates time (t), and the vertical axis indicates frequency (f), and the frequency band is divided to a plurality of chunks.

In this example, as long as the user terminal UE1 is connected to the base station, a particular channel CH1 is assigned to the UE1. When the user terminal UE1 generates data at times t1 and t3, a necessary control signal is transmitted using the dedicated control channel CH1 according to the data generation. Also, a dedicated control channel CH2 is assigned to the user terminal UE2 during connection, data is generated at times t2 and t3, and a necessary control signal is transmitted using the dedicated control channel. At t3, although both of the user terminals UE1 and UE2 transmit an uplink control signal at a same time frame, collision does not occur since they use respective dedicated control channels.

[non-patent document 1] 3rd Generation Partnership Project; Technical specification Group Radio Access Network; UTRAN Iur interface user plane protocols for Common Transport Channel data streams (Release 1999)

DISCLOSURE OF THE INVENTION

Problem to be Solved by the Invention

In the method for assigning the dedicated control channel in the uplink shown in FIG. 1, a dedicated control channel is assigned while the user terminal is connecting even in time periods during which the control channel is not actually used. Thus, remarkable reduction of use efficiency of radio resources occurs.

Therefore, a method can be considered, using a timer, for releasing the dedicated control channel after a predetermined time elapses even while the user terminal is connected to the base station. However, since the dedicated control channel is not continuously used during the predetermined period in which the dedicated channel is assigned, waste cannot be avoided to some extent.

Therefore, an object of the present invention is to improve use efficiency of radio resources in the system as a whole by realizing efficient assignment of the control channel for a control signal transmitted by an uplink.

In addition, an object of the present invention is to provide an efficient channel structure in the uplink.

Means for Solving the Problem

According to an aspect of the present invention, an assignment method for a channel used particularly for transmitting a control channel from the user terminal to the base station is provided. The channel assignment method includes:

(a) a step of setting an uplink common control channel commonly used for all users belonging to a base station;

(b) a step of assigning an uplink data channel to a user terminal according to a reservation channel transmitted from the user terminal using the uplink common control channel; and (c) a step of assigning an uplink shared control channel to the user terminal in association with the uplink data channel.

According to the channel assignment method, transmission efficiency for uplink control signal increases so that use efficiency of radio resources improved in the system as a whole.

According to a second aspect of the present invention, a radio communication system for performing proper channel assignment is provided. In the radio communication system:

a user terminal transmits a reservation packet to a base station;

according to the reservation packet, the base station assigns an uplink data channel to the user terminal, and assigns a first shared control channel to the user terminal in association with the uplink data channel, and the mobile station transmits a control signal to the base station using the uplink shared control channel associated with the data channel.

By using a channel suitable for transmission of an uplink control channel from the user terminal to the base station, use efficiency of radio resources improves.

According to a third aspect of the present invention, a channel structure for transmitting a control signal in an uplink is provided. The channel structure includes:

(a) an uplink common control channel that is commonly used for all users belonging to a base station and that transmits a reservation packet from a user terminal; and (b) a first uplink shared control channel that is assigned to a user terminal in association with an uplink data channel assigned to the user terminal from the base station according to the reservation packet.

In a preferred configuration example, the channel structure further includes:

(c) a second uplink shared control channel assigned by the base station beforehand according to the reservation packet such that occupation by the user terminal is permitted only while the user terminal is performing communication.

Effect of the Invention

By performing channel assignment optimum for transmitting a control signal in the uplink, use efficiency of radio resources improves in the system as a whole.

BRIEF DESCRIPTION OF THE DRAWINGS

FIG. 1 is a diagram showing a conventional assignment example of the dedicated control channel for the uplink control channel;

FIG. 2 is a table showing types of uplink control signals;

FIG. 4 is a diagram showing an example for assigning a pre-assigned-type uplink shared control channel that is assigned for each user only during communication in physical control channels;

FIG. 5 is a diagram showing an assignment example of a data channel associated shared control channel that is associated with an uplink data channel in physical control channels;

FIG. 6B is a diagram showing an example for transmitting a control signal using a physical control channel;

FIG. 7 is a diagram showing an example for transmitting a control signal using an uplink data channel that is assigned by performing a normal assignment procedure in data channels;

FIG. 9 is a diagram showing an example for transmitting an uplink control signal using an uplink direct access channel in data channels;

FIG. 10 is a table showing correspondence between uplink control signals and channels to be used.

Figure 3:
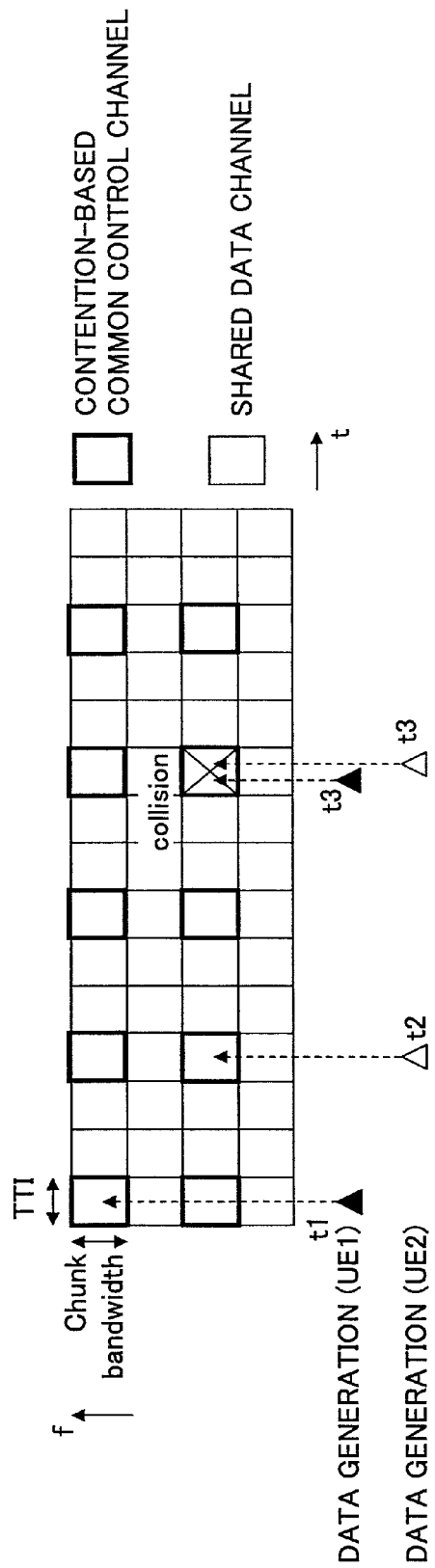
FIG. 3 is a diagram showing an example for assigning a contention-based uplink common control channel in physical control channels.

DESCRIPTION OF REFERENCE SIGNS 1 uplink common control channel
2a pre-assigned-type uplink shared control channel (second uplink shared control channel)
2b uplink shared control channel associated with data channel (first uplink shared control channel)
4a uplink data channel that is normally assigned
4b steel type uplink data channel
4c uplink direct access channel

PREFERRED EMBODIMENTS FOR CARRYING OUT THE INVENTION

In the following, a preferred embodiment of the present invention is described with reference to the attached drawings.

In the present invention, for both of a case in which a physical control channel is used and a case in which a data channel is used for transmitting an uplink control signal, optimum assignment of channels according to the type of the control signal is considered.

FIG. 2 is a table of types of uplink control signals mainly in the layer 1 and the layer 2.

(1) Control Signal for Uplink Data Transmission

First, there is a control signal for uplink data transmission as a control signal transmitted when transmitting an uplink data packet. This control signal for transmission includes information necessary for demodulating data packets such as a modulation coding scheme (MCS) and a block size.

(2) Uplink Retransmission Control Signal

Similarly, as a control signal transmitted when transmitting an uplink data packet, there is a retransmission control signal such as packet number as information in the transmitting side necessary for uplink retransmission control.

(3) Control Signal for Uplink Scheduling

In addition, there is a control signal for uplink scheduling. In this embodiment, reservation based packet transmission is assumed. In the reservation based packet transmission, at a time when data occurs in a buffer of the user terminal (UE), the user terminal transmits a reservation packet to the base station, and transmits data after waiting for assignment (scheduling) from the base station. The base station performs scheduling for uplink data, and the base station performs scheduling for the uplink based on the control signal for uplink scheduling from the user terminal. There are a queue ID, a data size, a transmission power of the user terminal (UE: user equipment) in the control signal for the uplink scheduling.

The queue ID is identification information for identifying each of a plurality of streams, generated in the user terminal, that are user data, signaling information, voice data, handover request and the like. The base station determines uplink scheduling for data sent to the base station based on these pieces of information included in the uplink control signal when receiving reservation. For example, the base station increases priority of uplink transmission for a handover request, and decreases priority according to a degree of QoS, and the like.

The control signal for uplink scheduling is transmitted to the base station (a) at a time of initial reservation request (when starting communication), (b) at a time of reservation request during performing communication, or (c) periodically or at a time of state change. The time of reservation request when starting communication is a time when data occurs in a buffer of the user terminal (UE) as mentioned above. The time of reservation request during performing communication is a time when handover request arises while communication is being performed, or the like. The time of state change is a time when new data is added to the buffer of the user terminal during data transmission.

(4) Downlink Retransmission Control Signal

When the user terminal receives a downlink data packet from the base station, the user terminal transmits a control signal of the receiving side necessary for downlink retransmission control. For example, the signal is ACK, NACK or the like.

(5) Control Signal for Downlink Scheduling

The user terminal transmits a control signal for downlink scheduling periodically or when state changes. The control signal is a state (CQI: Channel Quality Indicator) of a downlink radio channel measured in the user terminal, for example.

(6) Feedback Signal for Downlink Transmission

In addition, the user terminal transmits a feedback control signal used for downlink data transmission periodically or when the state changes. This case corresponds to a case for transmitting a bit for transmission phase adjustment to a base station in transmission diversity in a MIMO system, for example.

As to any of the above-mentioned control signals, it is necessary to report a user terminal (mobile apparatus) ID with the signal when sending the signal. As to manners for reporting the mobile apparatus ID, (i) it is explicitly reported using a dedicated field and the like when transmitting the control signal using a shared control channel, or (ii) it is implicitly reported when the control signal is transmitted by a dedicated control channel since the mobile apparatus ID can be determined from the assigned channel.

In a case of a mobile apparatus ID (MS-ID) for each cell, 10-12 bits are necessary, but when UE-specific CRC based on UE-id is used, a dedicated bit is not necessary.

As methods for transmitting these control signals to the base station, a method for transmitting using a physical control channel and a method for transmitting using a data channel can be considered. In the following, each manner is described.

FIGS. 3-6 are diagrams showing channel assignment examples when transmitting the uplink control signal using a physical control channel. As assignment methods of the physical control channel, following methods for:

(1) using a contention-based common control channel commonly used for all users belonging to a base station, (2a) using a pre-assigned-type shared control channel that is pre-assigned only for each user that is performing communication, and (2b) using an associated shared control channel assigned to each user being associated with a data channel when transmitting a data packet, are described.

FIG. 3 is a diagram showing an example for assigning a contention-based common control channel to an uplink control signal. Since all users belonging to the base station uses the common uplink control channel, this manner permits contention.

In the figure, the lateral axis indicates time (t) which is divided into predetermined transmission time intervals (TTI), and the vertical axis indicates frequency (f) which is divided into a plurality of chunk bandwidths. Each bock enclosed by a solid line is a shared data channel for transmitting a data packet, and a frame enclosed by a thick line is an uplink common control channel that permits contention. Assuming that, at time t3, data is generated in both of the user terminal (UE) 1 and a user terminal (UE) 2 and that the data is buffered, a collision of control signals occur in the common channel, so that one of the control signals is received by the base station.

The base station transmits ACK corresponding to the received control signal to a user terminal (UE1, for example) using a downlink control channel. Another terminal (UE2) that does not receive ACK retransmits a control signal after a predetermined time or after a random delay. Control of traffic is performed, for example, by persistent control in which the base station reports establishment to the user terminal using a broadcast channel (BCH).

This manner of transmitting the control signal using the uplink common control channel is used, for example, for transmitting, to the base station, a signal that arises suddenly such as a reservation packet, and an uplink scheduling control signal at the time of state change.

FIG. 4 is a diagram showing an example for assigning a pre-assigned-type shared control channel to an uplink control signal. In a shared channel, only users assigned by the base station share the channel. The pre-assigned-type shared control channel is a channel that the base station assigns to a user terminal beforehand when performing reservation for starting communication, and that is assigned to each user only during communication (in active mode).

In FIG. 4, each of upper side divided blocks each enclosed with a thick frame is a shared channel assigned to the user terminal (UE1) when receiving a reservation packet from UE1 at a time t0 that is not shown in the figure, for example. In the same way, each of lower side divided blocks each enclosed with a thick frame is a shared channel assigned to UE2. While UE1 and UE2 are in an active mode, each user assigned the shared channel occupies the shared channel, and transmission assignment for each transmission time interval (TTI) by the base station is not performed. Therefore, at the time t2, even when control signals such as a handover request arise at the same time, they transmitted to the base station without delay.

When UE1 or UE2 does not actually perform communication (even while it is connecting), the channel is released and shared by other users.

Such a pre-assigned-type shared channel is suitable for transmitting an uplink scheduling signal such as a handover request that suddenly arises during communication, suitable for transmitting a downlink scheduling signal such as CQI that is transmitted to the base station periodically or when state changes, suitable for transmitting a feedback signal that is fed back to the base station for downlink transmission, or the like.

FIG. 5 is a diagram showing an explicit assignment example of an associated shared control channel that is associated with a data channel. The associated shared control channel is assigned to each user in association with transmission of a data packet. In the example of FIG. 5, each diagonally shaded block is a shared control channel that is assigned to the user terminal UE1 in association with transmission of a data packet.

For example, when the base station assigns an uplink chunk in a downlink control channel, the base station explicitly assigns, at a first frame, a data channel (DCH) 2 and a shared control channel (CCH) 2 associated with it to the user terminal (UE) 1. In a frame after two frames from the first frame, the base station assigns, to the same UE1, data channels (DCH) 3 and 4 and associated shared control channels (CCH) 3 and 4. Only when transmitting a data packet using an assigned data channel, UE1 can transmit a necessary control signal using the associated shared control channel. Other than when transmitting the data packet, they are released and assigned (sharing of radio resources) to other users. In this example, when transmitting a control channel associated with the assigned data channel, MS-ID is explicitly reported by control information.

As an example of implicit transmission assignment, for example, when the base station assigns associated shared control channel when the base station transmits a downlink data packet such as ACK and NACK, it can be implicitly ascertained that, from the channel, the assignment is for UE1.

It is desirable that the data channel associated type shared control channel is assigned to transmission of a control signal arising when transmitting an uplink data packet, that is, transmission of control information such as MCS necessary for demodulating a data packet, or transmission of information such as packet number necessary for uplink retransmission control, or transmission of a signal for downlink retransmission control such as ACK/NACK.

Figure 6A:
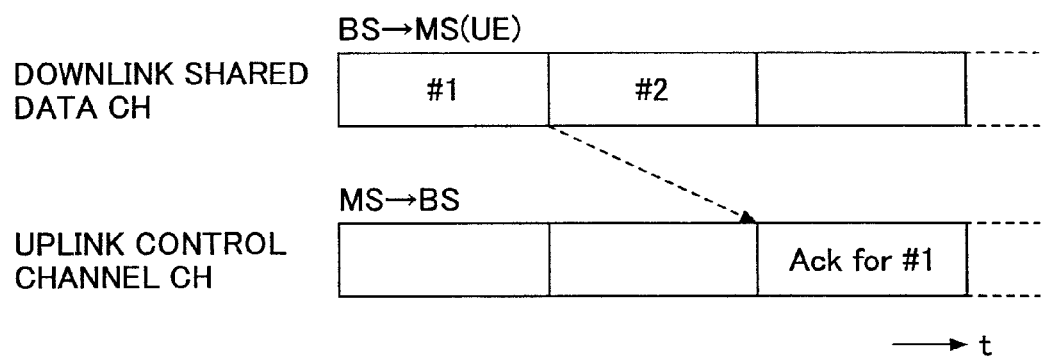
FIG. 6A is a diagram showing an example for transmitting a control signal using a physical control channel.

FIGS. 6A and 6B are diagrams showing examples of allocation of the above-mentioned three types of uplink control channels. In the example of FIG. 6A, a data frame #1 is transmitted to the user terminal (UE) using a downlink shared data channel from the base station, and the user terminal UE transmits ACK for the frame #1 after two frames. This ACK may be returned using a contention-based uplink common control channel, or may be returned using a shared control channel assigned to the user terminal beforehand or assigned to the user terminal in association with a data channel.

In the example of FIG. 6B, the user terminal (UE) transmits a reservation packet to the base station using an uplink common control channel (1). The base station performs assignment of a data channel for the UE1 using a downlink control channel. An associated uplink shared control channel (2b) is assigned in association with this assigned uplink data channel. The base station also transmits ACK for reporting reception of the reservation packet. After predetermined TTI, the base station assigns an uplink data channel and a shared control channel (2b) that is associated with the uplink data channel to the UE1.

Good use efficiency for radio resources is obtained by the method of assigning the associated shared control channel (2b). However, when a handover signal arises between an assignment of a data channel and another assignment of a data channel at timing shown by a triangle in FIG. 6B, for example, a handover signal cannot be transmitted until next data channel and shared control channel associated with it are assigned.

Thus, for example, when the moving speed of the user terminal (UE) is high or when change of radio environment is high or the like, the system can be configured such that the pre-assigned-type shared control channel (2a) is assigned. As mentioned above, the pre-assigned-type shared control channel is specifically assigned to UE1 only during actual communication, that is, only in a time period from data occurrence in the UE1 until data transmission completes so that the buffer becomes empty.

Accordingly, the channel configuration of the present embodiment includes an upper common control channel that is commonly used by all users belonging to the base station, and an associated shared control channel assigned to a user terminal in association with an uplink data channel assigned to the user terminal from the base station. In the common control channel, a reservation packet and a control signal (including queue ID and information on data size) for uplink scheduling are transmitted, for example.

In addition, according to the circumstances, a second shared control channel that is permitted to use exclusively by a user terminal only during a time period from data occurrence to completion of transmission in the user terminal may be assigned beforehand according to a reservation packet.

Next, an example of transmitting a control signal using an uplink data channel is described with reference to FIGS. 7-9. In these examples, the control signal is treated in the same way as user data and transmitted by a data channel (as data).

FIG. 7 shows an example for transmitting an uplink control signal using a shared data channel (4a) that is assigned from the base station by performing a normal procedure. That is, the user terminal UE1 transmits a reservation packet for transmitting a control signal using a contention based uplink common control channel at a time t1. The base station assigns an uplink data channel DTCH2 to the UE1 according to the reservation packet. The UE1 transmits the control signal using the assigned data channel DCH2. In this case, although a certain amount of delay occurs from the time of transmission (t1) of the reservation packet to the time of transmission of the control signal using the data channel DTCH2 since a normal data channel assignment procedure is performed, the control signal can be transmitted with a procedure same as that for transmitting data. For example, when a handover request arises during data transmission, the handover request can be transmitted by embedding it into data.

Figure 8:
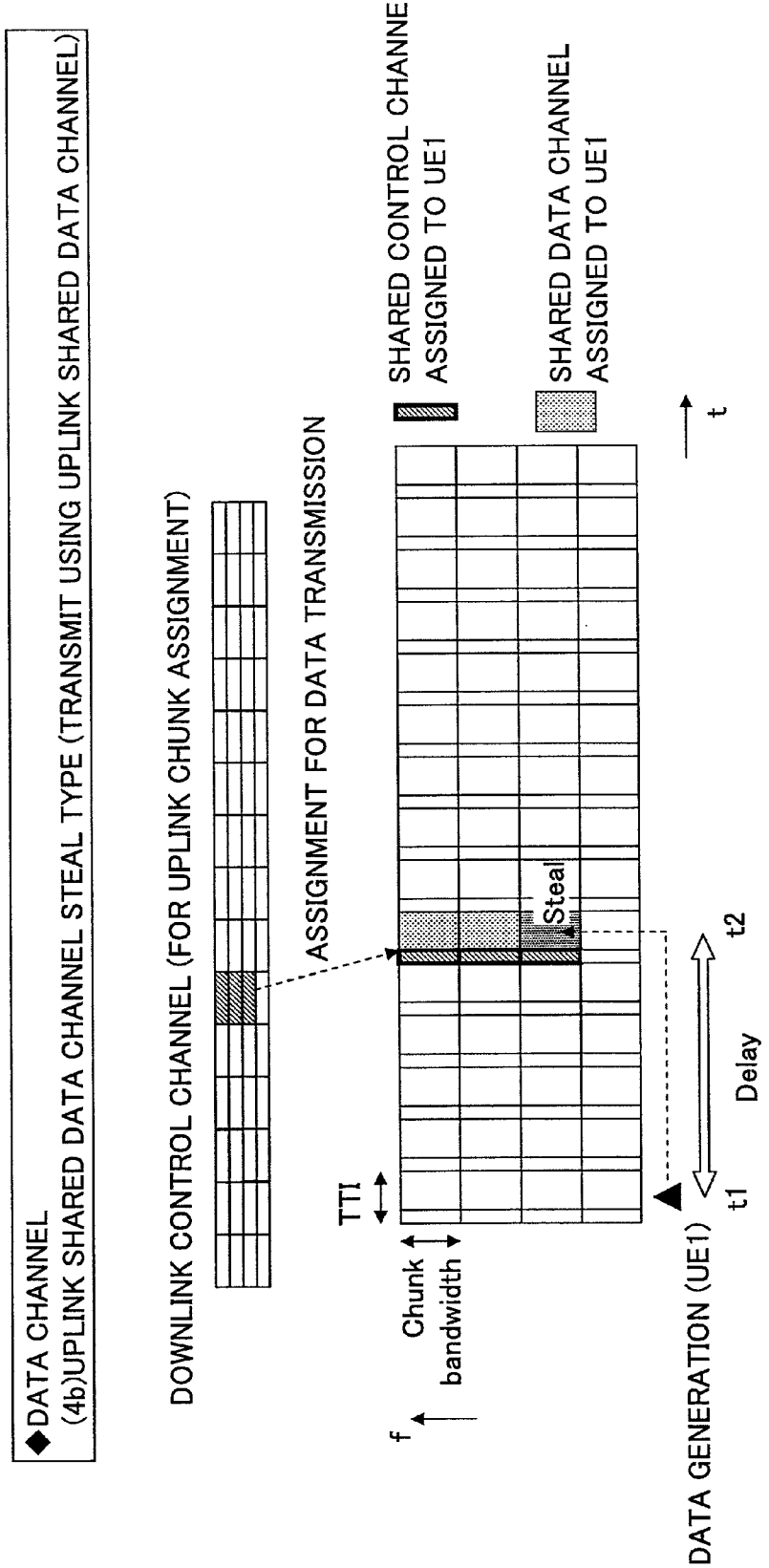
FIG. 8 is a diagram showing an example for transmitting an uplink control signal by stealing a data channel assigned for already reserved data in data channels.

FIG. 8 shows an example for transmitting an uplink control signal using an interruption type or a steal type uplink shared data channel (4b). In this example, when transmission is assigned by the base station for data for which transmission has been reserved, a control signal of data generated after that is transmitted by interrupting (stealing) the assigned data channel. That is, at the time t1, data is generated in the user terminal UE1. At the time t2, an uplink data channel and an uplink shared control channel associated with it are assigned to data for which transmission has been reserved before t1. A control signal for the data generated at t1 is transmitted using the assigned data channel. In this example, when priority of the data that has been reserved is low, although delay from the time of data generation at t1 to the time of data channel assignment at t2 becomes large, the control signal can be transmitted using a data channel allocated as necessary without transmitting a reservation packet.

FIG. 9 shows an example for transmitting an uplink control signal using a contention based uplink direct access channel (4c). As shown in the figure, since the channel is a contention-based channel, although there a possibility that contention occurs, relatively large-sized control data can be transmitted without delay.

FIG. 10 shows a table associating control signals transmitted using an uplink with channels suitable for transmitting the control signals. A control signal for uplink data transmission (1) and a control signal for uplink retransmission control (2) are signals that arise when transmitting an uplink data packet, and are suitable for being transmitted by the associated shared control channel associated with a data channel.

In uplink scheduling signals (3), the common control channel is suitable for reservation packet transmission at the time of start of communication or during communication. A handover request and a control signal when a state changes are suitable for transmission using the pre-assigned-type uplink shared control channel. Of course, these control signals for uplink scheduling may be transmitted using an uplink data channel.

It is efficient that a signal (4) for downlink retransmission control such as ACK/NACK is transmitted using an uplink shared control channel associated with a data channel assigned from the base station.

It is appropriate that a control signal (5) for downlink scheduling such as CQI (channel state signal) transmitted to the base station periodically or when state changes is transmitted using the pre-assigned-type uplink shared control channel that is assigned beforehand while communication is being performed.

In the same way, a feedback control signal (6) that is fed back for downlink data transmission to the base station is applicable for transmission using the pre-assigned-type uplink shared control channel.

Accordingly, in the present invention, various uplink control signals are transmitted based on efficient channel use so that use efficiency of radio resources can be improved in the system as a whole.

The present application claims priority based on Japanese patent application No. 2005-174401, filed in the JPO on Jun. 14, 2005 and the entire contents of it are incorporated herein by reference.

The invention claimed is:
1. A channel assignment method, comprising the steps of:
assigning an uplink common control channel commonly used by user terminals to a block that is different from a block where an uplink data channel should be set, wherein blocks each of which is formed by a predetermined time interval and a predetermined bandwidth are arranged in a time axis and a frequency axis;

assigning the uplink data channel to a user terminal according to a reservation packet transmitted from the user terminal using the uplink common control channel;

assigning, in association with the uplink data channel, a first uplink shared control channel for the user terminal to a block to which the uplink data channel is assigned; and assigning a second uplink shared control channel that can be shared by user terminals to a block that is different from the block where the uplink data channel is set according to the reservation packet.

2. The channel assignment method as claimed in claim 1, further comprising the step of:

causing the user terminal to transmit a contention-based uplink direct access channel.

3. A radio communication system, wherein:

a user terminal transmits a reservation packet to a base station using an uplink common control channel commonly used by user terminals, wherein the uplink common control is assigned to a block that is different from a block where an uplink data channel should be set, and wherein blocks each of which is formed by a predetermined time interval and a predetermined bandwidth are arranged in a time axis and a frequency axis;

according to the reservation packet, the base station assigns the uplink data channel for the user terminal, and assigns, in association with the uplink data channel, a first uplink shared control channel for the user terminal to a block to which the uplink data channel is assigned; and the base station assigns a second uplink shared control channel that can be shared by user terminals to a block different from the block where the uplink data channel is set according to the reservation packet.

4. A base station apparatus, comprising:

a first assigning unit configured to assign an uplink common control channel commonly used by user terminals to a block that is different from a block where an uplink data channel should be set, wherein blocks each of which is formed by a predetermined time interval and a predetermined bandwidth are arranged in a time axis and a frequency axis;

a second assigning unit configured to assign the uplink data channel to a user terminal according to a reservation packet transmitted from the user terminal using the uplink common control channel;

a third assigning unit configured to assign, in association with the uplink data channel, a first uplink shared control channel for the user terminal to a block to which the uplink data channel is assigned; and a fourth assigning unit configured to assign a second uplink shared control channel that can be shared by user terminals to a block that is different from the block where the uplink data channel is set according to the reservation packet.

5. A user terminal that transmits a signal to a base station apparatus, comprising:

a first transmission unit configured to transmit a reservation packet using an uplink common control channel that is assigned to a block different from a block where an uplink data channel should be set and that is commonly used by user terminals, wherein blocks each of which is formed by a predetermined time interval and a predetermined bandwidth are arranged in a time axis and a frequency axis;

a second transmission unit configured to transmit data using the uplink data channel assigned by the base station apparatus according to the reservation packet transmitted using the uplink common control channel;

a third transmission unit configured to transmit a control signal using a first uplink shared control channel that is assigned to a block to which the uplink data channel is assigned in association with the uplink data channel; and a fourth transmission unit configured to transmit a control signal using a second uplink shared control channel that is assigned, by the base station apparatus, to a block different from the block where the uplink data channel is set and that can be shared by user terminals according to the reservation packet.

* * * * *